April 13, 1965     A. P. ANDERSON ETAL     3,178,222

SEAT BELT HOLDER

Filed Jan. 2, 1963

ALAN P. ANDERSON
JESSE W. RICHARDS
INVENTORS

BY John R. Faulkner
Olin B. Johnson
ATTORNEYS

United States Patent Office 3,178,222
Patented Apr. 13, 1965

3,178,222
SEAT BELT HOLDER
Alan P. Anderson, Detroit, and Jesse W. Richards, Dearborn, Mich., assignors to Ford Motor Company, Dearborn, Mich., a corporation of Delaware
Filed Jan. 2, 1963, Ser. No. 248,953
2 Claims. (Cl. 297—385)

This invention relates to flexible holding means for use with seat belts.

In particular, this invention relates to a flexible seat belt holder for use with a seat belt which extends from an anchoring means to the surface of a seat and which passes between the seat and its associated back rest.

More particularly, this invention relates to a flexible, slipover belt holder for restraining a belt which extends between a back rest and a seat from creeping or otherwise withdrawing from the seat in the direction of its anchor when not in use.

Many types of safety belts and harnesses have been proposed for land, water, and air vehicles for restraining a seated occupant from being thrown from his seat as a result of a sudden movement for cessation of movement of the vehicle. Most generally, the safety belt or seat belt comprises two separate belt sections or straps. Each such section is secured to a mounting or anchoring device which usually passes through the vehicle body floor and is often secured to the vehicle chassis frame. When in use the opposite ends of the belt sections are passed forwardly, as for instance between the seat proper and the back rest, around the seat occupant, and are detachably and adjustably secured together by a buckle or other suitable engaging means. When not in use, the belt ends lie loose upon the seat and have a tendency to escape from the seat by slipping between the seat and the back rest. The normal forces acting upon a vehicle seat, as, for example, movement of the vehicle or movement on the seat such as that resulting from passengers entering or leaving the vehicle or shifting on the seat, are known to cause a swallowing action between back rest and cushion or seat proper. This results in a creeping or slipping motion of the belt end or ends through the passageway or clearance between back rest and seat. This movement often is not terminated until at least one belt end has completely escaped from the seat to the floor behind the seat.

It is an object of this invention, therefore, to provide flexible belt holding means for preventing slippage of a seat belt through the space provided between a seat and its back rest.

It is another object of this invention to provide a substantially cylindrical seat belt holder having an upstanding lip and an internal passageway therethrough constructed and arranged to receive and retain a seat belt and bearing an uneven surface positioned so as to cooperate with such lip when the latter is in contact with the back rest of the seat thereby obstructing rearward withdrawal of the belt from the holder.

Other features and objects of this invention will appear in the following description and appended claims, reference being had to the accompanying drawing forming a part of the specification wherein like reference characters designate corresponding parts in the several views.

Figure 1:
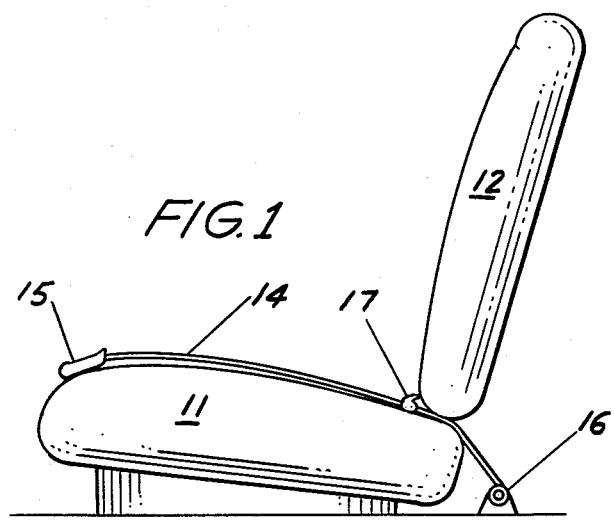
FIGURE 1 is a side view in elevation of a motor vehicle seat and associated seat belt with the seat belt passing through a holder embodying the principles of this invention.
Figure 2:
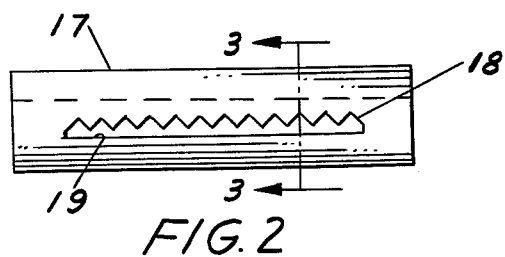
FIGURE 2 is an end view in elevation of the seat belt holder shown in FIGURE 1.
Figure 3:
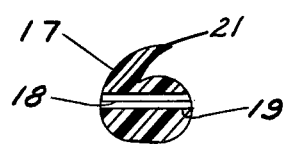
FIGURE 3 is a sectional view of the seat belt holder taken along line 3—3 of FIGURE 2.

Referring now to the drawing, the numerals 11 and 12 indicate the seat proper and the back rest, respectively, of the front seat of an automobile. One section of a seat belt 14 having a buckle 15 located at its free end is shown extended forwardly across seat 11. Belt 14 is shown passing between seat 11 and back rest 12 to a conventional belt anchoring means 16 positioned below and slightly to the rear of seat 11. Positioned near the front surface of back rest 12 is a preferred embodiment of the seat belt holder of this invention with belt 14 passing therethrough.

Holder 17 is preferably formed of a yieldable plastic material, i.e., a flexible or resilient organic polymeric material such as polyethylene, polypropylene, or a suitable form of synthetic or natural rubber. Holder 17 is provided with an uneven surface 18 which forms one wall of a belt channel or passageway 19 extending through the holder. In this embodiment surface 18 is a grooved or serrated surface with the resulting teeth or tooth-like projections extending longitudinally of passageway 19. It will be understood that such teeth could extend transversely across the passageway.

The size and external configuration of holder 17 is designed with a view to preventing escape of the holder between back rest and seat. Such escape would, of course, defeat the intended purpose of preventing similar escape by the belt end. Likewise, holder 17 is preferably designed to minimize any discomfort to the occupant of the seat. Thus, the holder is preferably substantially cylindrical or spherical in shape and bears a flexible, preferably curved, flange or lip 21.

In use, belt 14 is passed through passageway 19 of holder 17 and the latter is positioned on the seat just ahead of the back rest with lip 21 inclined toward or in contact with the back rest. Thus, if there is any tendency for the aforementioned swallowing action of the belt between seat and back rest to occur, the rearward creeping action of the belt would carry the holder toward the back rest. Such movement is resisted by flexible lip 21. Force applied to lip 21 is transmitted to the main body of the holder compressing the latter and forcing the upper and lower walls of passageway 19 to grip the belt therebetween. The uneven or toothed surface 18 thus bites into the belt with sufficient force to arrest its rearward movement. Thus, until pressure is exerted on lip 21, holder 17 is held in position on belt 14 by the flexible natural tension of the plastic holder, passageway 19 preferably being constructed to be slightly smaller than belt 14 when undistorted. Upon the application of such pressure, holder 17 resists retraction of the belt by wedging action.

Although the invention has been described in its preferred form with a certain degree of particularity, it is understood that the present invention disclosure of the preferred form has been made only by way of example, and that numerous changes in the details of construction and the combination and arrangement of parts may be resorted to without departing from the spirit and the scope of the invention as hereinafter claimed.

We claim:
1. A seat belt holder comprising a flexible substantially cylindrical member having a substantially rectangular passageway therethrough aligned in transverse relation to the longitudinal axis of said member and a curved projecting flange paralleling the longitudinal axis of said member, said passageway being constructed and arranged to receive and retain a seat belt end passed therethrough, at least one of the walls of said passageways bearing a plurality of tooth-like projections which extend into said passageway and into contact with a seat belt passed therethrough, said flange being constructed and arranged to cooperate with said tooth-like projections so that when force is exerted against said flange in the direction by which said belt enters said passageway said member and said passageway therein are compressed forcing said tooth-like projections against said belt with a force sufficient to wedgably restrain said belt from being withdrawn from said passageway.

2. A seat belt holder adapted to prevent slippage of a seat belt between a seat cushion and a seat back toward the seat belt anchorage, said holder comprising a substantially cylindrical flexible member having a length greater than the width of a seat belt, said member having a substantially rectangular passageway therethrough extending transversely of the longitudinal axis of said member, and a flexible flange extending from the periphery of said member parallel to the longitudinal axis thereof, said passageway being constructed and arranged for the passage of a seat belt therethrough while maintaining frictional engagement therewith, flexible projections extending from the wall thereof into said passageway, said flange being constructed and arranged to cooperate with said flexible projections to restrain said belt from being withdrawn from said passageway when force is applied to said flange as the latter abuts a seat back, which force tends to rotate said flange toward said passageway.

References Cited by the Examiner
UNITED STATES PATENTS 2,225,472  12/40  Franklin _____ 24—129.2

FRANK B. SHERRY, *Primary Examiner.*